Feb. 23, 1965  J. W. BRIGHTMAN ETAL  3,170,176
MACHINE FOR MAKING LOCK NUTS
Filed June 19, 1962  2 Sheets-Sheet 1
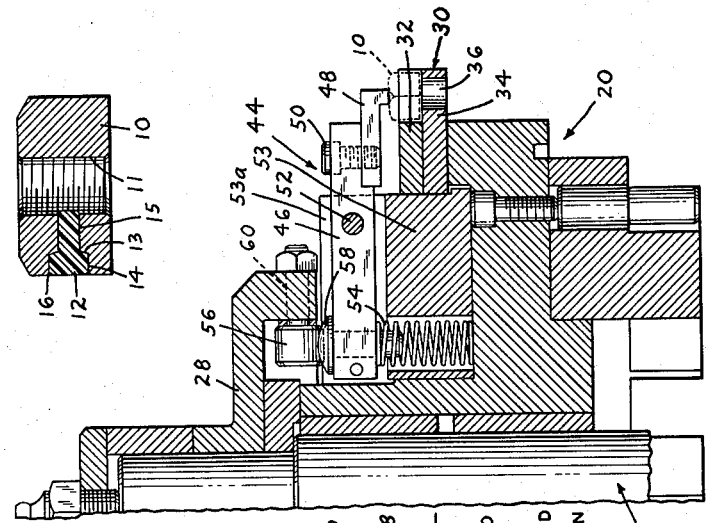
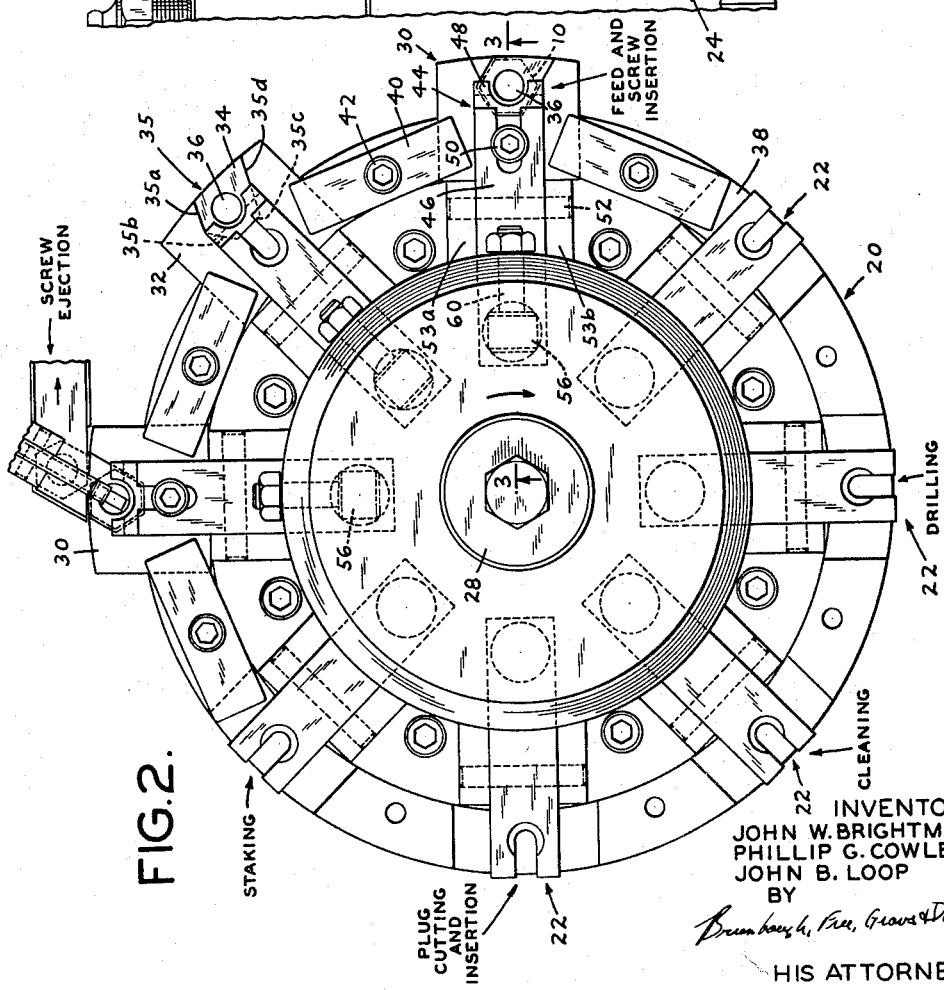
INVENTORS:
JOHN W. BRIGHTMAN
PHILLIP G. COWLEY
JOHN B. LOOP
BY
HIS ATTORNEYS Feb. 23, 1965 J. W. BRIGHTMAN ETAL 3,170,176
MACHINE FOR MAKING LOCK NUTS
Filed June 19, 1962 2 Sheets-Sheet 2
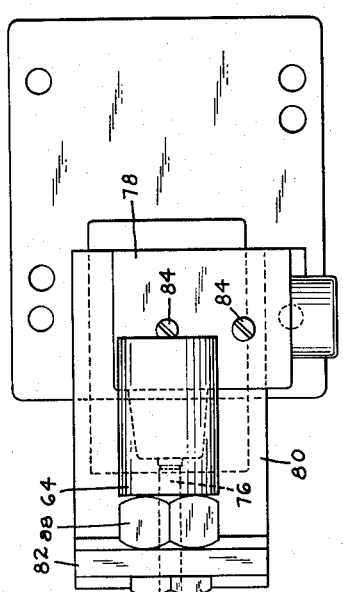
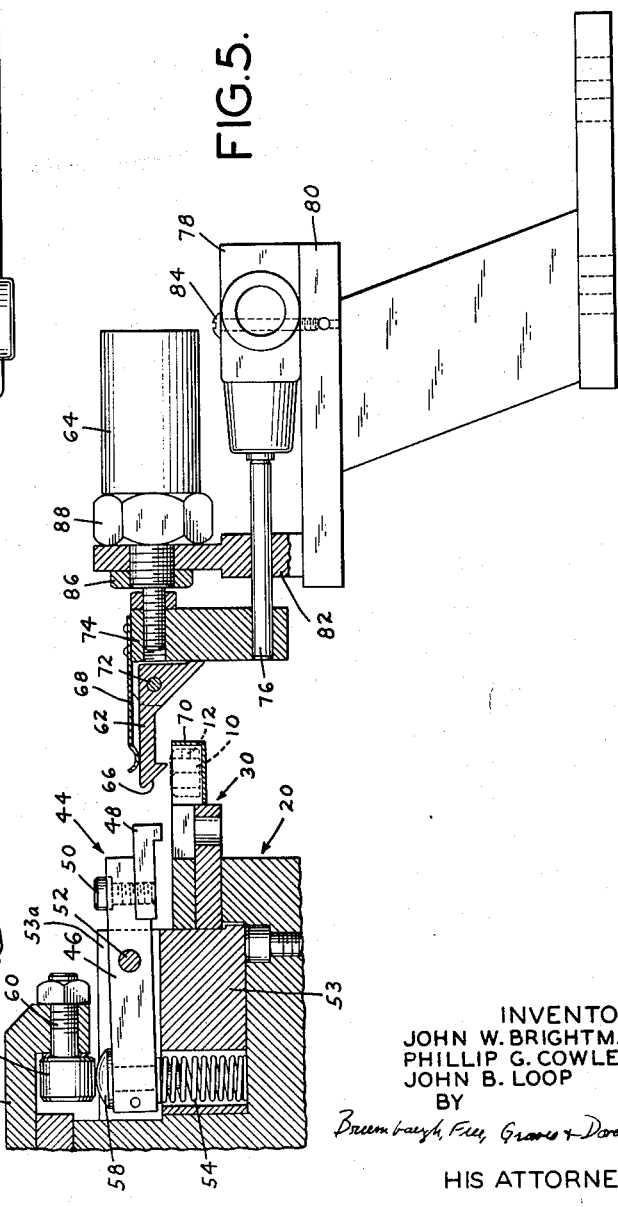
INVENTORS:
JOHN W. BRIGHTMAN
PHILLIP G. COWLEY
JOHN B. LOOP
BY
Brumbaugh, Free, Graves + Donohue
HIS ATTORNEYS

United States Patent Office 3,170,176
Patented Feb. 23, 1965

3,170,176
MACHINE FOR MAKING LOCK NUTS
John W. Brightman, Ridgewood, and Philip G. Cowley and John B. Loop, Fair Lawn, N.J., assignors to The Nylok Corporation, Paramus, N.J., a corporation of Delaware
Filed June 19, 1962, Ser. No. 203,505
5 Claims. (Cl. 10—72)

This invention relates to improvements in machines for manufacturing lock nuts, and more particularly to an improved jig for holding nuts in a machine which inserts a plug of nylon or other yieldable material into a nut to form thereby a self-locking nut.

The Boots U.S. Patent No. 2,462,603, issued February 22, 1949, discloses a self-locking friction-grip nut in which a plug of yieldable material, typically nylon, is inserted radially through the side of a nut. This material frictionally engages the screw on which the nut is threaded, and prevents the nut from becoming accidentally loosened. Machines designed to make such self-locking nuts are disclosed in the MacBlane et al. U.S. Patent No. 2,643,403, and the Borner U.S. Patent No. 2,779,039. In one form of the machine disclosed the workpieces, preformed, hexagonal nut blanks are received in a rotary table, and the table is indexed through a plurality of positions, so that the nut is presented to stations where successive steps leading to the insertion of the resilient locking plug are performed, such as drilling, threading, cutting, inserting the plug, staking, and the like.

Experience has shown that an essential condition to high speed production of commercially satisfactory and uniform products is that the nut be firmly held in position. In the machine described by MacBlane, the socket which receives the nut has three faces to engage three adjacent surfaces of a nut. When a nut is received in the socket, it assumes a position such that one of the wrench receiving flats of the nut is oriented substantially in the outer circumference of the rotary table. Although a fence or other guide mechanism may be used to prevent the nut from accidentally falling out due to the action of the tools, experience has shown that, despite such precautions a nut sometimes tends to move in the recess as it is indexed from one station to another so that misalignment occurs.

According to this invention, a new jig or socket is provided to hold the work firmly in position. The jig comprises means to engage the nut on a plurality of sides including at least two parallel sides. For example, four faces of a hexagonal nut are engaged by the walls of the jig or socket. Further, by orienting two parallel sides at an angle to the axis on which the tools operate, the tendency of the nut to move between stations is lessened. Because of the improved grip on the nuts afforded by this jig, and the angle at which the nut is ejected from the jig, a special disengaging finger is provided to remove the nuts after they are finished.

For a better understanding of the invention, reference may be had to the accompanying drawings in which:

FIGURE 1 is an illustration of a typical nut manufactured by a machine embodying the invention;

FIGURE 2 is a plan view of the rotary indexing table which holds the nuts;

FIGURE 3 is a partial sectional vertical view through the rotary table of FIGURE 2;

FIGURE 4 is a plan view showing the disengaging finger; and

FIGURE 5 is a vertical view partially in section of the disengaging finger.

Referring first to FIGURE 1, the type of nut produced in the machine described comprises a nut member 10 having a central bore 11 which may be prethreaded or threaded by the operation of the machine described hereinafter, as disclosed in the MacBlane et al. and Borner patents. A plug 12 of nylon or other resilient material is disposed in a bore in the wall of the nut and is retained in position by means of a shoulder 13 formed at the intersection of a larger bore 14 and a smaller inwardly positioned bore 15 and by means of peened or staked over edge 16 engaging the outer end of plug 12.

For illustrative purposes, the manufacture of the nut in FIGURE 1 using a preformed threaded hexagonal nut as a starting material will be described. Concentric holes 14 and 15 are drilled radially through one of the flat faces of the nut and a plug 12 of nylon is inserted therein with sufficient force to deform the plug and casue it to assume the shape shown in FIGURE 1. The edge 16 is peened or staked over the head of the nylon insert to hold it firmly in place and to prevent it from falling out of its hole.

These steps may be conveniently carried out by sequentially presenting a nut to a plurality of work stations arranged around a rotary table. A typical rotary table 20 (FIGS. 2 and 3) for such a machine having work stations 22 is mounted on shaft 24. Indexing means (not shown) whose operation is described in the MacBlane patent drive the table through successive positions from the bottom 26. If desired, driving means and work stations such as those disclosed in Borner Patent No. 2,779,039 may be used. Shaft 24 is stationary for purposes to be described hereunder, and a stationary cap 28 is affixed thereto.

As described above, experience has shown the necessity of firmly retaining the workpieces in position at each station 22. Accordingly, an improved jig 30 is provided to receive the workpieces. As shown in FIGURES 2 and 3 this jig comprises two plates 32 and 34 typically steel, the thicknesses of the plates being approximately equal and further being preferably about ⅔ of the height of the nut 10 being processed. The upper plate 32 has a slot 35 formed herein whose sides engage corresponding wrench receiving flats on the nut 10 being processed. Accordingly, when a hexagonal nut is being processed, the adjacent faces of the slot 35 are at an angle of 120° to each other. A further feature of the socket 35 is that it has enough faces so that the slot has at least two parallel and nonradially inclined faces (i.e. 4 faces 35a, 35b, 35c and 35d for a jig to hold a hexagonal nut). The two parallel faces 35a and 35d form the entry slot through which the nut being processed is slidably inserted and ejected. The second plate 34 of the jig forms the base on which the nuts rests. Member 34 has drilled therein a hole 36 which corresponds with the threaded hole of the nut when inserted. Accordingly, tools, particularly a tapping tool, may be turned through to the workpiece without obstruction from the jig.

Members 32 and 34 are mounted in recesses 38 formed into the perimeter of rotary table 20. Hold down bars 40 and screws 42 are used to clamp the assembly against movement. The socket formed by the slot 35 and member 34 receives nut 10 as indicated. The height of the socket is not critical; however two conditions must be met. If the socket is deeper than the height of nut 10, the clamp 44 described below will not grip the nut properly. If the socket is too shallow the nut will tend to pop out of position. A socket having a depth of about two-thirds of the nut-height is preferred.

A further feature of jig 30 is the orientation of the parallel sides 35a and 35d of slot 35 with respect to the axial direction of the tools. Tools for use with rotary table 20 are normally designed to drill, cut and insert the plug, stake, etc., in a radial direction with respect to the table. By orienting the parallel sides 35a and 35d at an angle to this radial direction, the face 35a holds the nut against outward movement in a radial direction as the tool is being retracted.

In order to assure further that the nut will remain in the desired position a supplementary clamp 44 is provided to engage the nut and prevent accidental vertical movement. The clamp 44 includes a lever 46 with a forked end portion 48 attached thereto by means of screw 50. Lever 46 is pivotally mounted on a pin 52 extending between blocks 53a and 53b pivoted to the table 20. As shown in FIG. 3 the blocks 53a and 53b may be spaced portions of a block 53. Spring 54 biases the lever member so that the forked member 48 presses firmly against the nuts. Forked portion 48 has two fingers 48a and 48b (FIG. 4) with an arcuate section 48c therebetween so that a tool, such as a tapping tool, may enter the bore of the nut.

In order to release the clamp 44 at the injection and ejection stations, rollers 56 are mounted in the stationary cap 28 which engage a bossed head 58 on the inner end of lever arm 46. As shown most clearly in FIGURE 5, a roller 56 depresses the inner end of lever arm 46 and thereby raises the fingers 48 from the nut. Roller 56 is affixed to the stationary cap 28 by means of a nut and bolt 60 or the like. Rollers 56 are provided at the feed and ejection stations, and may optionally be provided at any other station where it is desired to release the nut for manipulative purposes.

Because the improved jig 30 holds the nut against radial movement an ejector is provided which is shown in FIGURES 4 and 5. The ejector comprises a hook 62 which is actuated by an air cylinder 64 so that it moves into and out of the socket in a direction parallel to the sides 35a and 35d. Hook 62 has a slanting forward face 66 which raises the hook member 62 as it is moved into the socket containing a nut. Spring 68 biases the hook member so that after the forward face 66 has passed over the edge of the nut, the hook will engage in the threaded bore of the nut. Air cylinder 64 then reverses to withdraw the nut to a chute 70 by which it leaves the machine. Chute 70 is preferably offset downward from the level at which the nut leaves jig 30 so that the nut will drop from hook 62. Hook 62 is pivotally mounted at 72 in yoke member 74 which carries spring 68. Yoke member 74 also carries a push rod 76 which actuates a microswitch 78. Microswitch 78 is thereby responsive to the position of hook 62 and aids in controlling the movement of the table. The control mechanism for the air cylinder is synchronized with the operation of table 20. The mechanism may be of any conventional design. The air cylinder 64 and microswitch 78 are supported by a base member 80 and a supporting bracket 82 by means of screws 84 and nuts 86 and 88.

Although the rotary table and improved jig described comprises a plurality of members held together by screws and clamps, it will be obvious that the number of parts is only a matter of convenience in manufacture and assembly. Equipment such as here described may be assembled from unitary or a plurality of parts, as may be convenient. Further, although the jig is specifically described in a machine for the manufacture of lock nuts, it is evident that the jig has other utility in manufacturing operations where a polygonal object in to be subjected to a plurality of sequential operations. The above described embodiment accordingly is for illustrative purposes only, and variations may be made therein without departing from the spirit of this invention as defined by the following claims.

We claim:

1. In a machine for making nuts comprising means for receiving a nut blank and presenting said blank in turn to a plurality of tools which perform successive operations in the manufacture of said nuts, including tools which operate on an axis which is perpendicular to a wrench receiving flat on said nut blank; a jig for holding said nut blank comprising a socket having a base and a plurality of side walls, said base engaging the bottom of said nut blank and said walls engaging the wrench receiving flats of said nut blank, two of said side walls being parallel to form thereby a slot through which said nut blank may be inserted into and ejected from said jig, said parallel side walls being at an acute angle to the axis of said tools which operate perpendicularly to said wrench receiving flat of said nut blank.

2. In a machine for making nuts comprising means for receiving a polygonal nut blank having $2n$ sides and presenting said blank in turn to a plurality of tools which perform successive operations in the manufacture of said nuts, a jig for holding said blank having a base and $n+1$ side walls, said base adapted to engage the bottom of said nut blank, two of said side walls being parallel, and forming a slot through which said blank may be inserted into and ejected from said jig and the remainder of said side walls forming a polygonal end closure for said slot, each side wall adapted to engage a corresponding face on said nut, the parallel side walls of said slot being inclined to the axis of tool operation.

3. In a machine for making hexagonal nuts comprising means for receiving a hexagonal nut blank, and presenting said blank in turn to a plurality of tools which perform successive operations in the manufacture of said nuts, a jig for holding said blank having a base and four side walls, said base adapted to engage the bottom of said nut blank, and each of said side walls being at an angle of about 120° to each of the adjacent side walls, whereby two of said side walls are parallel and form a slot through which said blank may be inserted into and ejected from said jig and each of said side walls is adapted to engage a corresponding face on said blank, the parallel side walls of said slot being inclined to the axis of tool operation.

4. In a machine for making nuts comprising means for receiving a nut blank and presenting said blank in turn to a plurality of tools which perform successive operations in the manufacture of said nuts; a jig for holding said nut blank comprising a socket having a base and a plurality of side walls, said base engaging the bottom of said nut blank and said side walls engaging the wrench receiving flats of said nut blank, two of said side walls being parallel to form thereby a slot through which said nut blank may be inserted into and ejected from said jig, the parallel side walls of said slot being at an acute angle to the axis of tool operation, and means positively engaging said nut blank to forcibly eject said blank from said jig.

5. In a machine for making nuts comprising means for receiving a nut blank and presenting said blank in turn to a plurality of tools which perform successive operations in the manufacture of said nuts; a jig for holding said nut blank comprising a socket having a base and a plurality of side walls, said base engaging the bottom of said nut and said side walls engaging the wrench receiving flats of said nut, two of said side walls being parallel to form thereby a slot through which said nut blank may be inserted into and ejected from said jig, the parallel side walls of said slot being oriented at an acute angle to the axis of tool operation, a hook, and means actuating said hook to a first position in said slot and a second position out of said slot, said hook springedly engaging a nut blank in said slot in said first position and ejecting the engaged nut blank in said second position.

References Cited in the file of this patent

UNITED STATES PATENTS

| | | |
|---|---|---|
| 1,257,391 | Potuzak | Feb. 26, 1918 |
| 1,918,150 | Swahnberg et al. | July 11, 1933 |
| 2,090,949 | Richards | Aug. 24, 1937 |
| 2,643,403 | MacBlane et al. | June 30, 1953 |
| 2,703,894 | Goldberg | Mar. 15, 1955 |
| 3,085,264 | Stern | Apr. 16, 1963 |